United States Patent [19]

Pittet, Jr. et al.

[11] 3,953,084

[45] Apr. 27, 1976

[54] TOWED VEHICLE ELECTRIC BRAKE CONTROL

[75] Inventors: Rene E. Pittet, Jr., Marshall; Philip J. Grant, Homer, both of Mich.

[73] Assignee: Tekonsha Engineering Co., Tekonsha, Mich.

[22] Filed: June 30, 1975

[21] Appl. No.: 591,435

Related U.S. Application Data

[62] Division of Ser. No. 385,102, Aug. 2, 1973, Pat. No. 3,909,075.

[52] U.S. Cl. .............................. 303/24 R; 188/3 R; 188/112; 200/61.49
[51] Int. Cl.² .......................................... B60T 8/16
[58] Field of Search .................. 188/3 R, 112, 138; 200/52 A, 61.02, 61.45 R, 61.48, 61.49; 303/20, 24 A, 24 R; 340/262

[56] References Cited
UNITED STATES PATENTS

| | | | |
|---|---|---|---|
| 2,686,853 | 8/1954 | Mathues | 200/61.49 |
| 3,226,675 | 12/1965 | Edwards | 200/61.45 R |

*Primary Examiner*—Duane A. Reger
*Attorney, Agent, or Firm*—Beaman & Beaman

[57] ABSTRACT

An electronic brake control for trailers utilizing solenoid operated electric brakes wherein trailer braking is controlled by sensing the rate of deceleration of the towing and towed vehicle producing an electric signal controlling a voltage controlled oscillator having a fixed frequency output and a variable pulse width, the pulse width increasing proportional to the rate of deceleration. The pulse signals are amplified and energize the towed vehicle electric brakes in an oscillating or pulsed manner to minimize skidding and brake locking. A light sensing circuit selectively shielded by a pendulum produces the automatic deceleration responsive signal, and manual apparatus are employed to produce trailer braking without braking of the towing vehicle. Additionally, the automatic electric brake system control through the brake light circuit is bypassed and isolated by actuation of the emergency warning brake light system.

3 Claims, 6 Drawing Figures

FIG. 6 PULSE WIDTH MODULATION CONSTANT FREQUENCY

TOWED VEHICLE ELECTRIC BRAKE CONTROL

This is a division of application Ser. No. 385,102, filed Aug. 2, 1973 now U.S. Pat. No. 3,909,075.

BACKGROUND OF THE INVENTION

The field of the invention relates to electric brake controls for towed vehicles wherein the rate of vehicle deceleration is automatically sensed to produce a pulsed electric brake actuation of the brakes of the towed vehicle.

The braking of towed vehicles, such as trailers, is produced by several types of systems. In commercial truck vehicles, such as semitrailers, the trailer brakes are normally pneumatically or vacuum operated, and are directly connected to the braking system of the towing tractor. With smaller towed trailers, particularly those of the type towed by automobiles, such as utility trailers, boat trailers, and recreational vehicle trailers, it is well known to employ electric brakes on the trailer wheels to improve the stopping characteristics. Such automobile-trailer braking systems usually employ electric solenoid operated brakes with the trailer, and an electric brake controller mounted in the automobile adjacent the steering column is usually connected to the automobile hydraulic braking system for automatic operation by the automobile braking system, and also usually includes a manual control whereby the trailer brakes may be actuated separately from the automobile brakes.

Electric trailer brake controllers operated by automobile hydraulic brake systems are relatively complicated to install in that connection to the automobile braking system is required. Additionally, as the braking characteristics of an automobile hydraulic system vary as the automobile brake shoes wear, known available towed vehicle braking systems of the aforementioned type have not proven completely reliable in operation and leave much to be desired with respect to sensitivity of operation, optimum braking application, and safety. This type of system is difficult to adjust so that the proper amount of trailer braking is produced under all conditions of automobile braking, and under adverse road conditions where the road surface is wet or slippery braking situations may arise where known trailer brake systems actually produce unsafe braking characteristics and may cause the trailer to "jacknife".

Various towed vehicle braking systems have been proposed wherein the braking of the trailer is automatically controlled by the sensing of deceleration forces. U.S. Pat. Nos. 2,242,153; 2,642,961; 2,779,443; 2,856,036 and 2,969,857 disclose automatic brake applying apparatus wherein the deceleration inertial force imposed upon the hitch by the trailer during deceleration of the towing vehicle is sensed and used to produce a braking of the towed vehicle. Such systems as disclosed in these patents have not enjoyed commercial success, and their complexity and limitations of operation have rendered the same generally unacceptable from a practical point of view.

It has also been proposed to use pendulum or mass movement sensing devices for sensing deceleration of a towed and towing vehicle wherein the pendulum operates a braking circuit of the towed vehicle, either mechanical or electric, in dependence upon the degree of the deceleration occurring. U.S. Pat. Nos. 2,870,876 and 3,053,348 disclose such pendulum sensing systems. While such pendulum type systems have the capability of a higher degree of sensitivity than inertia force towed vehicle braking systems associated with the trailer hitch, the systems of such known pendulum type patents also include limitations in operating and manufacturing characteristics rendering the same commercially impractical.

SUMMARY OF THE INVENTION

It is an object of the invention to provide an electronic towed vehicle brake control system which is practical from an operational and economical standpoint, is capable of accurately sensing deceleration of the towing and towed vehicle, and operates the electric brakes of the towed vehicle in such a manner as to produce optimum brake control, minimizing skidding and brake locking.

Another object of the invention is to provide an automatic electric brake control for towed vehicles wherein a pulsed actuation of the towed vehicle electric brakes is produced during braking, the duration of the pulse being proportional to the rate of deceleration thereby automatically producing a relationship between the degree of braking required, and the rate of deceleration.

Another object of the invention is to provide an electronic brake control system wherein the control circuit is automatically energized from the energizing of the towing vehicle brake light circuit during braking, but the system utilizes means preventing actuation of the brake control circuit when the brake light circuit is energized by the towing vehicle emergency warning light system connected to the brake lights.

In the practice of the invention the towed vehicle utilizes electric brakes, such as of the solenoid type. Deceleration sensing means, such as in the form of a pendulum, is mounted upon the towing vehicle and through electrical means, such as a light interruption circuit, produces an electronic signal proportional to the rate of towing vehicle deceleration. This signal is used to control a voltage controlled oscillator having a constant frequency output, and the oscillator output signal as determined by the pendulum has a pulse width which increases proportionally to the rate of deceleration. The output of the voltage controlled oscillator is amplified and energizes the solenoids of the towed vehicle electric brakes in the manner determined by the pulsed output of the voltage controlled oscillator. The degree of braking of the towed vehicle is thereby proportional to the rate of deceleration of the towing vehicle and is automatically achieved without direct connection to the towing vehicle hydraulic brake system.

The installation of a brake system in accord with the invention is simplified as compared with towed vehicle braking systems connected to the towing vehicle hydraulic brake system as the control housing is merely mounted on the towing vehicle near the driver and only electrical connections are required.

The brake system of the invention includes a manual control wherein the pulsed braking signals can be imposed upon the trailer brakes without actuation of the towing vehicle braking system and stoplights, and in this manner manual control of the trailer brakes may be achieved under those circumstances wherein such manual control is desirable and trailer braking without braking of the towing vehicle is required.

The preferred apparatus for sensing deceleration forces is by means of a weighted pendulum having a light impervious shield mounted thereon. The shield is interposed in a light path generated by a light source, and sensed by a photo cell device which comprises a light sensitive resistance permitting increased current to pass upon the photo cell receiving an increased amount of light. Deceleration forces imposed upon the pendulum tend to move the pendulum mounted shield from the light path increasing the current through the photo cell, and this system permits a high degree of sensitivity in that no frictional forces exist between the pendulum and the pendulum movement sensing apparatus. The pendulum and light sensing apparatus is mounted upon a support pivotal about an axis transversely disposed to the direction of towed vehicle movement, and adjustment means permit the support member to be horizontally adjusted about its axis for orienting the pendulum to its optimum position with respect to the towing vehicle in which it is mounted. Such adjustment permits "leveling" of the pendulum with respect to the towing vehicle, and assures uniformity of braking operation, and permits the operator to slightly vary the braking conditions in accord with his particular wishes.

BRIEF DESCRIPTION OF THE DRAWINGS

The aforementioned objects and advantages of the invention will be appreciated from the following description and accompanying drawings wherein:

FIG. 6 is a graph illustrating the relationship between braking pulse widths and constant frequency.

DESCRIPTION OF THE PREFERRED EMBODIMENT

Figure 1:
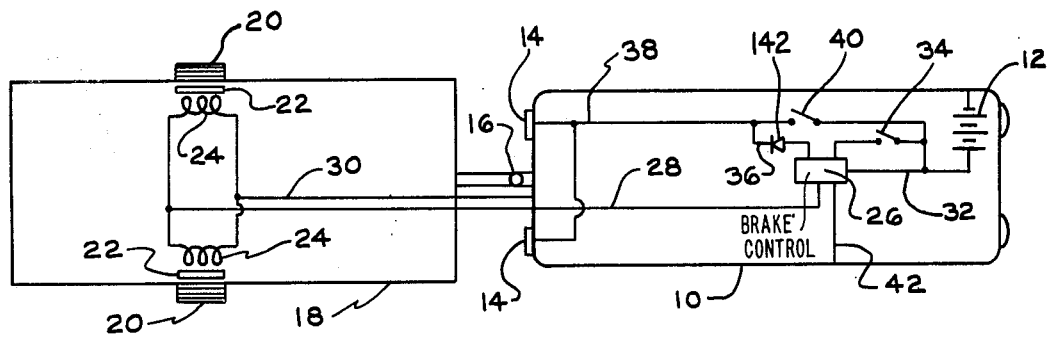
FIG. 1 is a schematic illustration of a towing and towed vehicle illustrating the basic braking circuit and components of the invention, and the emergency warning light system.

In FIG. 1 a schematic illustration of the braking system in accord with the invention is illustrated. The towing vehicle 10, usually an automobile or pickup truck includes a battery 12, brake lights 14, and a trailer hitch at 16. The towed vehicle, such as a travel trailer 18, is mounted upon road wheels 20, and each wheel has an electric solenoid operated brake 22 of conventional construction utilizing a solenoid coil 24 for actuation purposes.

The brake control mechanism is represented at 26, and includes an output conductor 28 extending to the trailer brake solenoids, which are connected in parallel, and a ground conductor 30 extends from the brake circuit to the vehicle 10. Of course, the battery 12 is grounded to the vehicle 10, and the other pole of the battery is connected to the brake control 26 through a fused conductor 32, and the stoplight switch 34. The stoplight switch 34 is controlled by the hydraulic pressure within the automobile braking system in the conventional manner, and upon the automobile brakes being applied conductor 36 extending from the brake control 26, connected to the brake light conductor 38, will energize the automobile brake lights 14.

An automobile emergency warning switch 40 is also connected to the battery 12 and the brake light conductor 38, and upon closing of the warning switch 40 the brake lights 14 will simultaneously flash, as is well known. The flashing mechanism for the warning system is not illustrated, but is of a conventional nature. The brake control 26 is grounded to the vehicle by conductor 42.

As will be appreciated from the following description, the brake control 26 senses deceleration of the towing vehicle 10 and the towed vehicle 18, producing a pulsed amplified signal energizing the trailer brakes 22 for braking the trailer wheels to a degree proportional to the rate of deceleration produced by the driver braking the towing vehicle 10. As will be appreciated, there is no connection between the brake control 26, and the conventional hydraulic brakes of the towing vehicle, not shown, and the brake control in accord with the invention is self contained and of an electronic nature.

Figure 2:
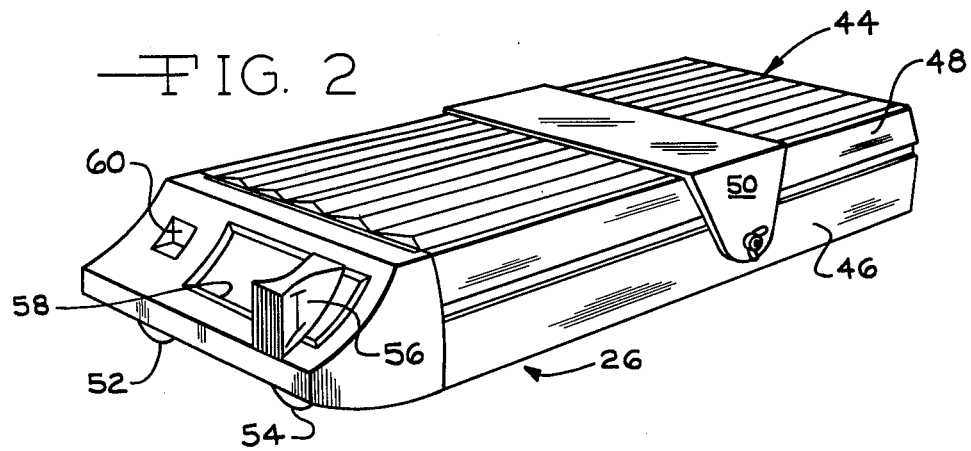
FIG. 2 is a perspective view of the housing for a brake control in accord with the invention.

The brake control 26 may be mounted within a housing such as illustrated in FIG. 2. The housing 44 includes a base 46, and a cover 48 which may be removed to provide access to the housing interior. The mounting bracket 50 permits the housing to be attached to the towing vehicle where desired, and, usually, the brake control housing will be attached to the steering column, as to be within easy reach of and at a convenient angle to the towing vehicle driver.

The housing exterior includes a gain potentiometer adjustment knob 52, a pendulum support adjustment knob 54, a manually operated linear potentiometer slide knob 56 horizontally movable within the housing slot 58, and a braking indicator light 60 visible to the driver.

Figure 3:
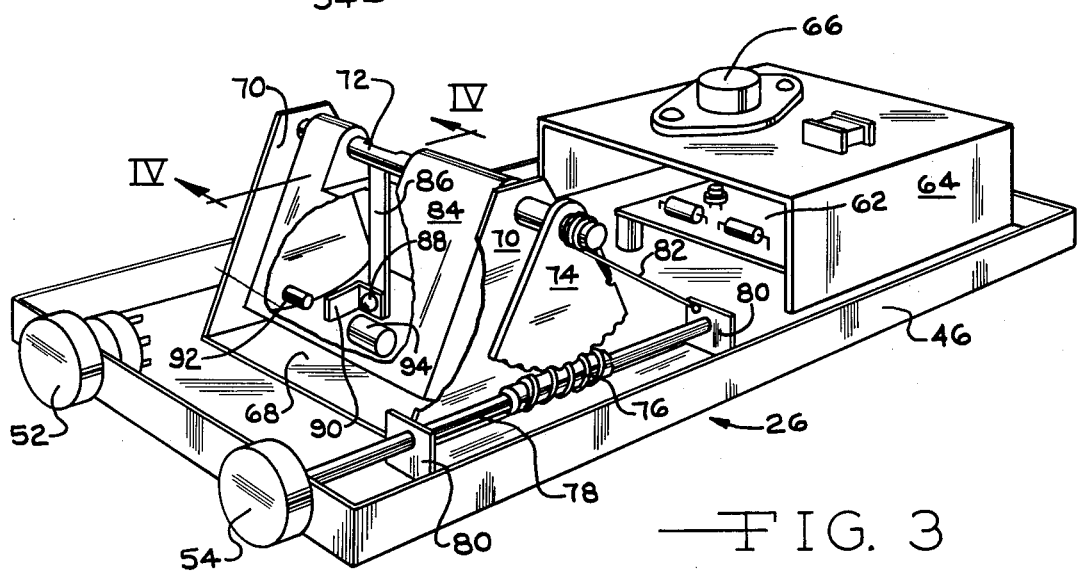
FIG. 3 is an enlarged perspective view of the housing of the brake control with the cover removed, and partially broken sections are taken through the pendulum and associated apparatus.

The base 46 supports a circuit board 62, and a support bracket 64 for the power transistor 66 and other electronic components. The electronic components are mounted at the "front" of the housing, i.e. at the forward portion of the housing with respect to the direction of travel of the towed vehicle, which is to the right as viewed in FIGS. 2 and 3.

At the rear of the base 46 the pendulum and light sensing apparatus is mounted and includes a U-shaped bracket 68 having a pair of spaced uprights 70 pivotally supporting a shaft 72 extending between the bracket uprights. Shaft 72 has a worm wheel 74 affixed thereto, and the worm wheel includes teeth meshing with a worm 76 fixed upon the worm shaft 78 rotatably mounted within the base upon bearing brackets 80. The shaft 72 is rotated by the driver exteriorly of the housing by the knob 54. A torsion spring 82 mounted upon the shaft 72 imposes a biasing force upon the sector 74 about the shaft axis as one end of the spring is attached to a fixed bearing bracket 80. In this manner backlash or vibration between the worm wheel sector 74, and the worm 76 due to gear teeth clearance is eliminated as the torsion spring will always maintain engagement of the sector gear teeth with one side of the teeth of the worm.

The support member housing 84 for the pendulum and light sensing apparatus is attached to the shaft 72, and is of a bell or triangular configuration having an increased dimension at its lower regions. The support 84 houses the pendulum 86 which is in the form of a thin cantilevered spring member affixed at its upper end to the shaft 72, and having a lower end including a weighted rivet member 88, and a shield 90 which extends in the direction of movement of the vehicles. The material of the pendulum 86 is of a light weight such that the pendulum is sensitive to deceleration and acceleration forces of the towing vehicle, and will readily deflect in a direction parallel to vehicle movement as the deceleration, or acceleration, forces vary. The pendulum 86 preferably consists of a lamination of two leaves of a material such as beryllium copper or phospher bronze bonded together with a nonbrittle shear resistant resin. This construction dampens the movement of the pendulum when subjected to sudden forces other than deceleration, such as road shocks. The shield 90 is formed of metal and is, of course, impervious to light.

A light emitting diode 92 is located within the support member 84, and is fixed to the support, and is fixed relative to the pendulum 86. A photo cell 94 is also mounted upon the support member 84 in opposed, spaced relationship to the light emitting diode 92, and is so positioned as to receive light from the diode. The light shield 90 extends between the diode and the photo cell, and will normally interrupt the light from the diode preventing such light to be received by the photo cell. However, under conditions of deceleration the pendulum 86 will swing to the right, FIG. 3, and light passing around the free end of the shield 90 from the diode 92 to the photo cell 94 will vary the resistance of the photo cell to produce a braking electronic signal.

The support member 84 is substantially light proof, and the rotation of the knob 54, and shaft 78, will produce a rotation of the shaft 72 about its axis which is transverse to the direction of vehicle travel. Such adjustment of the support member 84 will vary the orientation of the pendulum to the vertical, and, of course, cause the light shield 90 to vary slightly with respect to the light path between the light emitting diode 92 and the photo cell 94. The adjustment of the support member 84 is basically for the purpose of calibrating the brake control to the horizontal. The amount of adjustment will vary in each installation depending on how the housing 44 is mounted, and the amount of weight imposed upon the towing vehicle by the towed vehicle. By experience, the operator will soon locate that adjustment of the pendulum and support member which produces the braking characteristics he desires, and by the adjustment of the knob 54, it is possible, within relatively narrow limits, to adjust the sensitivity of the pendulum movement to deceleration forces.

Figure 5:
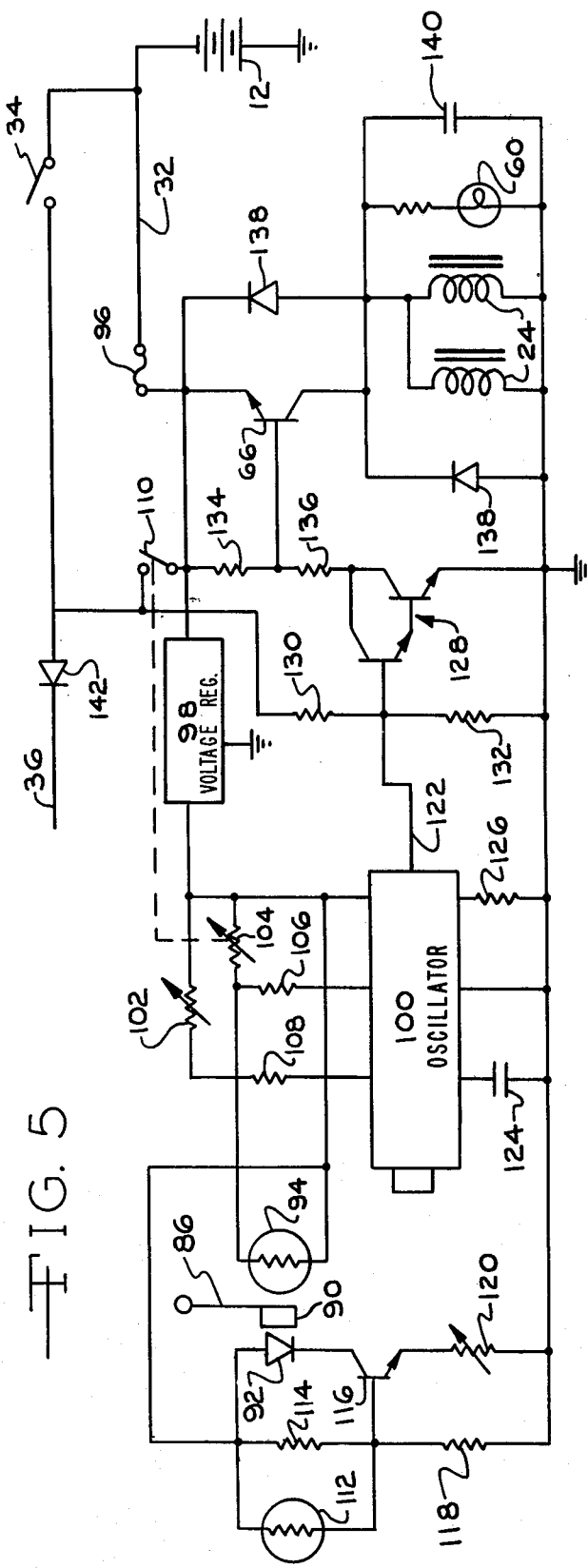
FIG. 5 illustrates the circuit of the brake control in accord with the invention.
Figure 4:
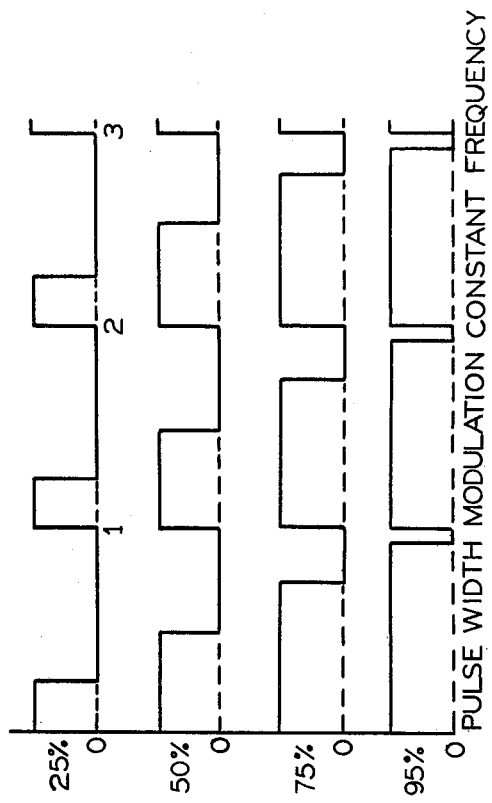
FIG. 4 is an elevational, sectional view taken through the pendulum support along section IV—IV of FIG. 3.
Figure 4:
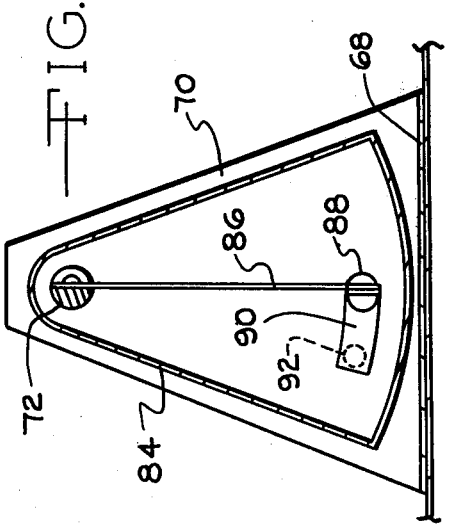

With reference to FIG. 5, the circuit of the preferred embodiment of the invention will be described.

The circuit is supplied from the electrical system of the towing vehicle 10 represented by battery 12, which will normally supply approximately 12 volts DC. This supply is fused at 96 and connected to a voltage regulator 98 having a constant output of 8 volts at positive potential. This constant voltage source is connected to a control circuit for the voltage controlled oscillator 100 consisting of an adjustable gain potentiometer 102 of 50K ohms, the manually adjustable linear potentiometer 104 of 300K ohms, a 33K ohm resistance 106 and a 22 K ohm resistance 108. The potentiometer 104 is mechanically connected to manual switch 110 which is closed upon operation of the manual potentiometer 104 when it is desired to manually actuate the trailer brakes by the potentiometer actuating knob 56 which controls potentiometer 104. The manual switch 110 is represented as a separate switch but it will be understood that switch 110 may be built into potentiometer 104 for closing during the initial actuation of the potentiometer.

The voltage controlled oscillator circuit described above is connected to the photo cell 94, which comprises a light sensitive resistance permitting more current to pass therethrough the greater the amount of light received by the photo cell. The photo cell 94 may be of the type commercially available as a Clairex CD705.

The light emitting diode 92 is so related to the photo cell 94 as to direct its light thereon, except when shielded by the pendulum shield 90, and a thermistor 112 of 10,000 ohm value plus or minus 10% at 25° C. maintains a constant current through the light emitting diode 92 regardless of temperature or voltage changes and serves as a regulator for the light emitting diode. 10K ohm resistance 114 is also included in this circuit. Transistor 116 is controlled by the thermistor 112 and is part of the constant current control circuitry for the light emitting diode 92, as is 4.7K ohm resistance 118, and the 470 ohm potentiometer 120 employed to set the current of the light emitting diode at a particular voltage. Thus, this circuitry will assure a predetermined light intensity at the light emitting diode 92 to produce consistent braking results under various ambient temperatures and conditions.

The circuit associated with the photo cell 94 controls the output of the voltage controlled oscillator 100, and the resistances 106 and 108 and potentiometers 102 and 104 are so determined that the output of the voltage controlled oscillator is at a constant frequency, but the width or duration of the pulse signal from oscillator will vary in accord with the current flow into the oscillator. The greater the current flow through photo cell 94, the longer the pulse of the signal for each cycle of oscillation from the oscillator output conductor 122.

A 100pf capacitor 124 and an 82K ohm resistance 126, are interposed between ground and the voltage controlled oscillator 100 to complete the oscillator circuit.

The output of the voltage controlled oscillator 100 is received by a Darlington transistor amplification circuit 128 which also includes a 5.1K ohm resistor 130, and 4.7K ohm resistor 132 which connect to the primary voltage supply conductor 32 due to the closing of the stoplight switch 34, under automatic control of the trailer brake circuit, or due to the closing of the manual switch 110 during manual control of trailer braking. The Darlington amplifier controls the output of the PNP 20 amp power transistor 66 whose circuit includes the 270 ohm resistor 134 and the 25 ohm, 15 watt resistor 136. The power transistor 66 is connected to the brake solenoid coils 24, and the output is also connected to the indicating lamp 60 mounted upon the brake control housing to produce a visual indication that braking is occurring. The circuit includes 3 amp diodes 138 which are for the purpose of protecting the transistor 66 from transients or voltage spikes, as does 0.01mf capacitor 140.

In the disclosed circuit it is to be understood that the voltage controlled oscillator 100, and its control circuit, including the light emitting diode 92 and photo cell 94, will always be "on" when the vehicle is in operation. Thus, no warmup period of the components for sensing deceleration are required.

However, as the amplification circuitry is not energized until the stoplight switch 34 is closed, or manual switch 110 is closed by potentiometer 104, this portion of the circuit remains deenergized until immediately needed.

If the driver slightly decelerates, such as by taking his foot from the towing vehicle throttle, but not applying the hydraulic brakes, the pendulum 86 may be displaced slightly, perhaps permitting light to fall upon the photo cell 94 producing a pulsed signal from the voltage controlled oscillator 100. However, as the stoplight switch 34 has not been closed, and assuming that the manual potentiometer 104 and switch 110 have not been actuated, no braking of the trailer brakes will occur. Upon the operator applying sufficient pressure to the towing vehicle brake pedal to close the stoplight switch 34, primary current will then be supplied to the amplification circuitry permitting the power transistor 66 to impose a pulsed energizing signal upon the brake solenoid coils 24 thereby applying the trailer brakes in a pulsating manner, the duration of pulsation per cycle of frequency of the signal being determined by the current being supplied to the voltage controlled oscillator as determined by the amount of light falling on the photo cell 94, under automatic operation, or determined by the manual control of the potentiometer 104 through knob 54. Thus, as soon as the switch 34 or the switch 110 is closed, current is available for actuating the towed vehicle brakes, and no delay in operation will be experienced if a braking signal is indicated at the oscillator output conductor 122. The braking "feel" or characteristics may be adjusted by regulating the gain potentiometer 102 by knob 52. As some drivers desire a more sensitive and responsive automatic braking action than others this adjustability of the circuit will accommodate individual preferences.

In FIG. 6 a graphic illustration appears indicating the type of braking signal which may be produced by the circuit of the invention for pulsing the towed vehicle electric brakes. In FIG. 6 the cycle of the voltage controlled oscillator 100 is represented at the horizontal ordinate, and the braking pulses are represented by the signal appearing above the zero lines. For instance, a 25% pulse width which would represent small braking forces, appears at the top of the graph, and a braking pulse for actuating the brake solenoids occurs only 25% of the time of each cycle. Twice as much braking occurs at a 50% pulse width, and three times the braking occurs at 75% of the pulse width. It is not anticipated that the pulse width will be much greater than 95% of a cycle, which would represent maximum braking, yet a momentary release of the brake solenoid still exists to safeguard against skids and brake locking.

It will therefore be appreciated that the pulsed signal produced by the towed vehicle braking circuit of the invention provides a superior braking action proving improved safety features, particularly on wet or slippery road surfaces.

With reference to FIG. 1, it is required by present safety laws that vehicles include an emergency warning flasher system for simultaneously flashing the brake lights and front parking lights of vehicles under certain conditions, such as stopping on a right of way, or to indicate slow moving vehicles. Of course, when the energizing warning switch 40 is closed causing a flashing of the towing vehicle stoplights 14, it is not desired that the towed vehicle brakes be applied each time the stoplights are energized. To prevent such occurrence, a diode 142 is placed in conductor 36 permitting energization of the stoplights when the stoplight switch 34 is closed, but preventing a feedback of current into the brake control 26 when the emergency warning switch 40 is closed.

We claim:

1. An inertial sensor for braking control apparatus as in towed vehicles comprising a shaft, a housing adjustably supporting said shaft on an axis transverse to the direction of movement of said towed vehicle, a laminated thin cantilevered spring member affixed at its upper end to said shaft and being weighted at its lower end and said spring member carrying a light interrupting shield, a light source provided on one side of said housing, and a light sensing target on the other side of said housing, said source and said target being on a common axis interrupted by selected movement of said spring member.

2. In the structure of claim 1 wherein said laminated thin spring member is metal and intermediate the layers of said laminar is a nonbrittle resin material bonded on both sides to said metal.

3. In the combination of claim 2 wherein said metal in said laminate is thin strips of beryllium copper.

* * * * *